(No Model.)

I. B. OLMSTED.
Steam Cooker.

No. 237,042.

Patented Jan. 25, 1881.

Witnesses.
Franck L. Ourand
J. J. McCarthy.

Inventor.
Ira B. Olmsted.
By Alexander Mason
Attorneys.

N. PETERS, PHOTO-LITHOGRAPHER, WASHINGTON, D. C.

UNITED STATES PATENT OFFICE.

IRA B. OLMSTED, OF CHARLESTON, ILLINOIS.

STEAM-COOKER.

SPECIFICATION forming part of Letters Patent No. 237,042, dated January 25, 1881.

Application filed October 29, 1880. (No model.)

*To all whom it may concern:*

Be it known that I, IRA B. OLMSTED, of Charleston, in the county of Coles, and in the State of Illinois, have invented certain new and useful Improvements in Steam-Cookers; and I do hereby declare that the following is a full, clear, and exact description thereof, reference being had to the accompanying drawings, and to the letters of reference marked thereon, making a part of this specification.

This invention relates to certain improvements in steam-cookers of that class in which the steam is generated in an outer vessel and supplied to an inner vessel containing the food or other article to be cooked by means of pipes, so as to circulate through the same and agitate as well as heat it.

The invention has for its objects to provide an improved arrangement of the pipes for connecting the inner and outer vessels, whereby the said pipes may be readily reached for cleaning, and also to furnish an improved means whereby provision is made for automatically admitting air to the outer vessel to prevent the formation of a vacuum therein, and the consequent suction of food from the inner vessel upon the cooling of the contents of the outer vessel, as more fully hereinafter specified. These objects I attain by the apparatus illustrated in the accompanying drawings, in which—

Figure 1:
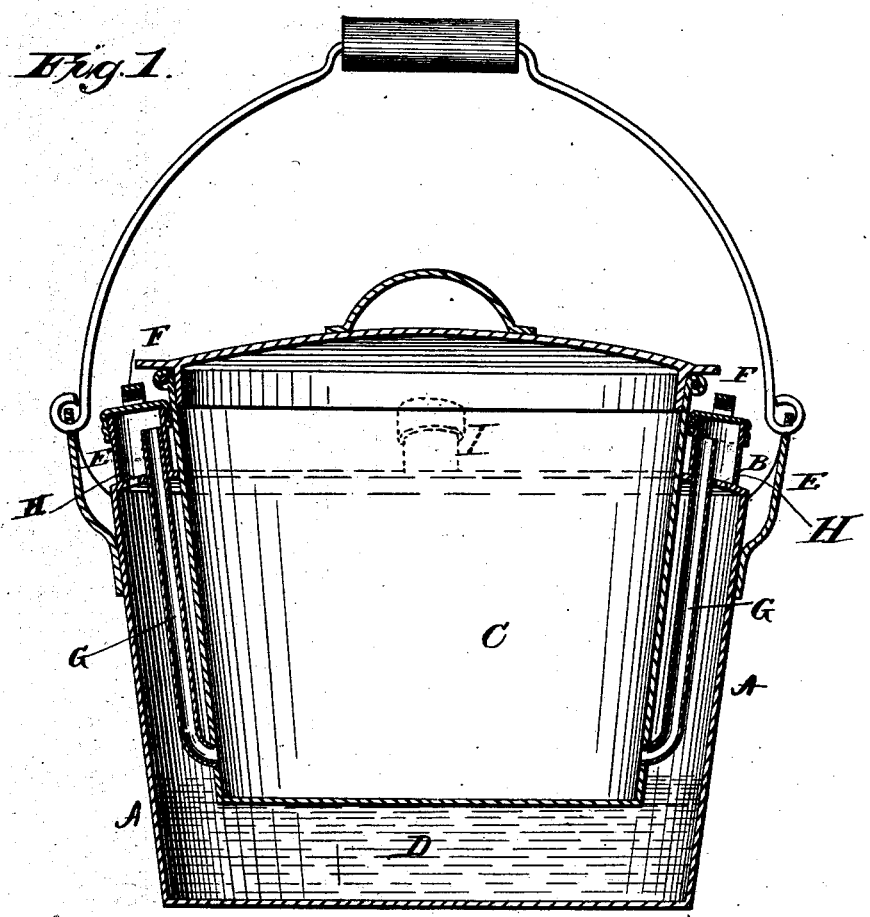
Figure 2:
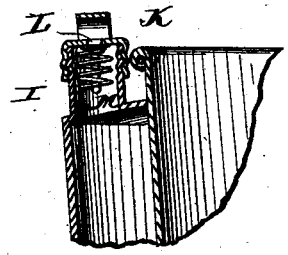

Figure 1 represents a vertical sectional view of my improved apparatus, and Fig. 2 a detached sectional view of the mechanism for automatically admitting air to the outer vessel.

The letter A indicates the outer vessel, which is formed with a shoulder, B, at its top.

C indicates the inner vessel, which sets in the mouth of the outer vessel, extending down into said vessel, having a space, D, between the two. The inner and outer vessels are secured by soldering at their juncture, so as to prevent the escape of steam at the joint.

The letter E indicates two tubes secured to the shoulder B of the outer vessel. These are screw-threaded at their ends, and provided with screw-caps F, by means of which access may be had to their interior. From these tubes extend downward the smaller tubes G, which open into the inner vessel near the bottom. The tubes E communicate with the outer vessel by means of openings H.

The letter I indicates a tube secured to the shoulder. This tube is similar to the tubes E, but communicates with the outer vessel only for the purpose of filling. The said tube I is provided with a screw-cap, K, which has an opening, L, through it, which is kept normally closed by a valve, M, which is held to its seat by a spring. The said valve is adapted to open inwardly, so as to automatically admit air upon the creation of a vacuum in the outer vessel, and thus prevent the food from the inner vessel being drawn into said outer vessel during cooling.

To employ my device the outer vessel is charged with water to about the level indicated and the food is placed in the inner vessel. The apparatus is then heated upon a stove, or by other means, the caps being secured upon the respective tubes E and I. The steam generated will pass down through the tubes G into the food, agitating it thoroughly during the process of cooking.

Having thus fully described my invention, what I claim, and desire to secure by Letters Patent, is—

1. In combination with the inner and outer vessels, the screw-capped tubes secured to the shoulder of the outer vessel and communicating with both vessels, substantially as and for the purposes specified.

2. In combination with the tube I, communicating with the outer vessel, and the tube G, communicating with the inner vessel, the screw-cap provided with an inwardly-opening valve, whereby air will be automatically admitted to the outer vessel when cooling, and the contents of the inner vessel prevented from being drawn over into said outer vessel, substantially as specified.

In testimony that I claim the foregoing I have hereunto set my hand this 11th day of October, 1880.

IRA B. OLMSTED.

Witnesses:
H. AUBREY TOULMIN,
J. J. MCCARTHY.